A. A. AMSTUTZ.
POSTHOLE DIGGING MACHINE.
APPLICATION FILED MAY 5, 1920.
1,381,052.
Patented June 7, 1921.
2 SHEETS—SHEET 1.
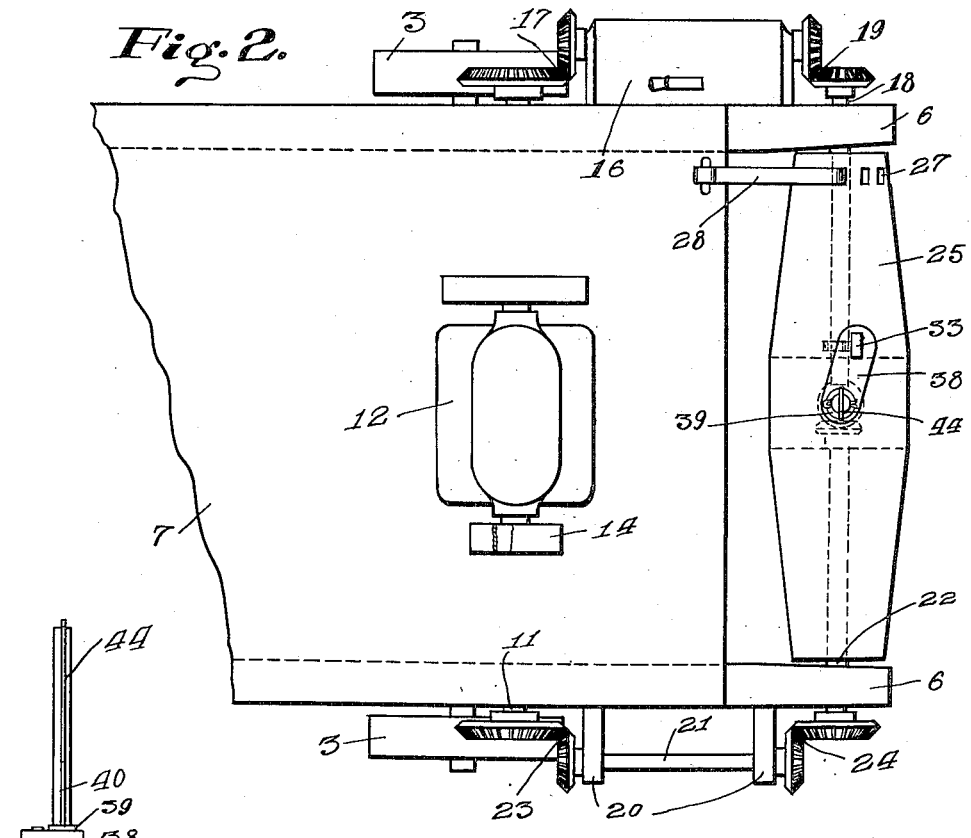
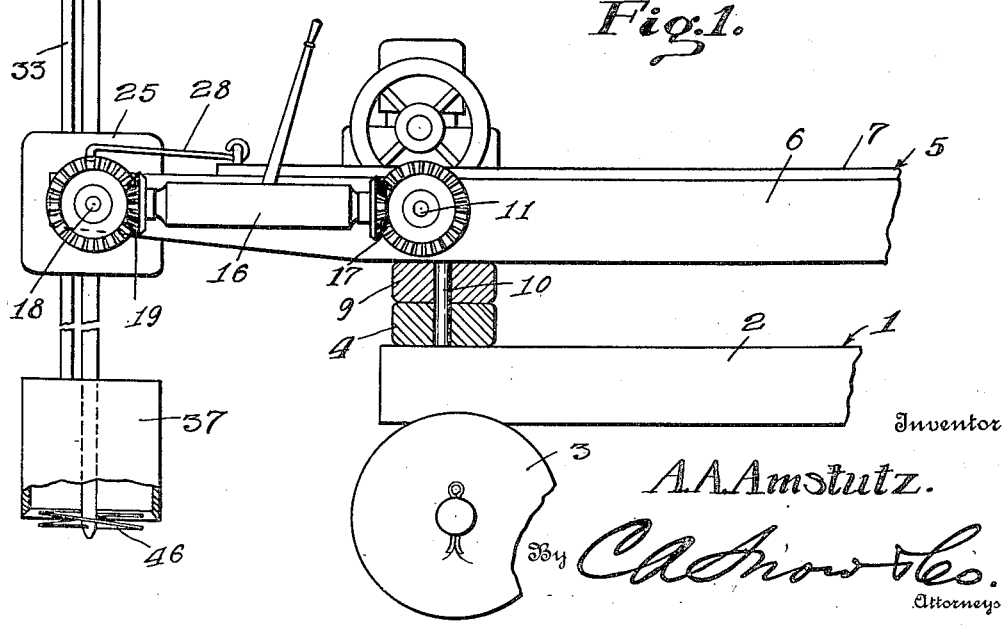

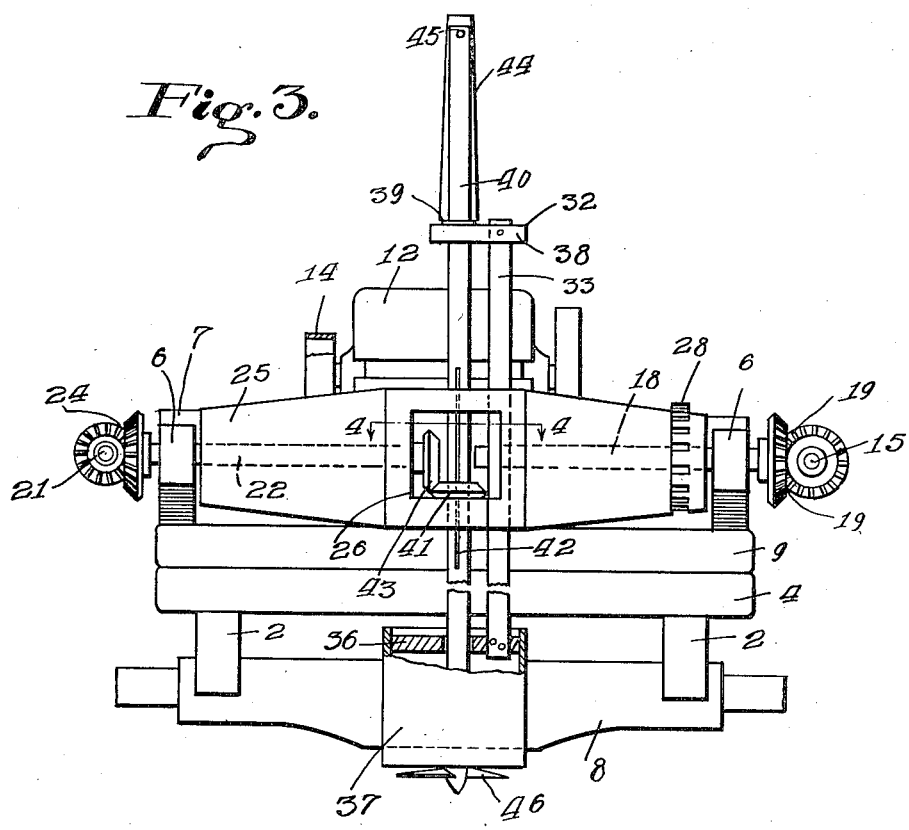
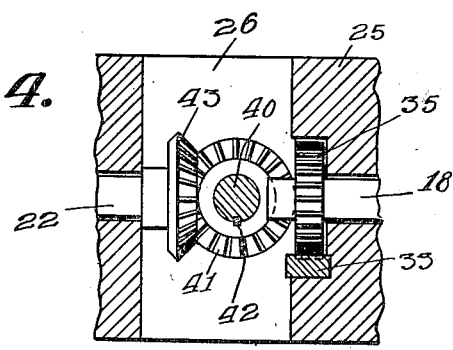

UNITED STATES PATENT OFFICE.

AMOS A. AMSTUTZ, OF BLUFFTON, OHIO.

POSTHOLE-DIGGING MACHINE.

1,381,052.    Specification of Letters Patent.    Patented June 7, 1921.

Application filed May 5, 1920. Serial No. 379,069.

*To all whom it may concern:*

Be it known that I, AMOS A. AMSTUTZ, a citizen of the United States, residing at Bluffton, in the county of Allen and State of Ohio, have invented a new and useful Posthole-Digging Machine, of which the following is a specification.

The device forming the subject matter of this application is adapted to be employed for boring holes in the ground for the reception of posts and for other purposes, and the invention aims to provide novel mechanism for shifting the boring means, to provide novel mechanism for actuating the boring means, and so to construct the machine that the dirt resulting from the boring operation may be discharged readily.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation a device constructed in accordance with the invention, parts being broken away; Fig. 2 is a top plan; Fig. 3 is an end elevation wherein parts are omitted, parts being shown in section; and Fig. 4 is a fragmental horizontal section taken approximately on the line 4—4 of Fig. 3.

In carrying out the invention there is provided a truck 1 comprising a frame 2 supported by an axle 8 carrying ground wheels 3. A bolster 4 is mounted on the frame 2. The device comprises, further, a frame 5 including side beams 6 carrying a platform 7. The side beams 6 are secured to a cross beam 9 bearing on the bolster 4, the parts 4 and 9 being connected by a pivot member 10 to the end that the frame 5 may be swung horizontally on the truck 1. The frame 5 projects forwardly beyond the truck 1, as shown in Fig. 1, and the horizontal swinging movement of the frame 5 permits the boring means, hereinafter described, to be located properly with respect to the place of boring, and to permit the machine to be operated under conditions in which room is limited.

A first shaft 11 extends transversely of the machine and is journaled for rotation in the side beams 6. An engine 12 is mounted on the platform 7 and is operatively connected with the shaft 11 by any suitable means, such as a belt 14. A second shaft 15 extends longitudinally of the frame 5 at one side thereof and is connected at its rear end, by means of beveled pinions 17, with the first shaft 11. The numeral 16 denotes the casing of a transmission mechanism which is interposed in the shaft 15. A third shaft 18 extends transversely of the frame 5 and is journaled at the forward end thereof in one of the side beams 6. The third shaft 18 is operatively connected with the forward end of the second shaft 15 through the instrumentality of beveled pinions 19. The transmission mechanism 16 is so constructed that the shaft 18 may be driven at different speeds from the shaft 11, by way of the shaft 15. Further, owing to the construction of the transmission mechanism 16, the shaft 18 may be reversed with respect to the shaft 11, or, if desired, the shaft 18 may remain at rest. The foregoing are merely the common and well known functions of a transmission mechanism, and any desired form of transmission may be used at the place indicated by the numeral 16.

Brackets 20 project laterally from one of the side beams 6 of the frame 5 and in the brackets is journaled a fourth shaft 21 disposed longitudinally of the machine. A fifth shaft 22 extends transversely of the machine and is alined with the shaft 18, the shaft 22 being journaled in that one or the side beams 6 which carries the brackets 20. Beveled pinions 23 connect the rear end of the fourth shaft 21 with the first shaft 11. Beveled pinions 24 connect the forward end of the fourth shaft 21 with the fifth shaft 22.

A carrier 25 extends transversely of the machine and is mounted to rock for adjustment on the shafts 22 and 18, the carrier being provided with a transverse opening 26. The carrier 25 is held in adjusted positions by means of a pawl 28 pivoted to the platform 7 and coöperating with a ratchet 27 on the carrier. The numeral 32 denotes, generally, a support which is adjustable in the carrier 25 in a direction at right angles to the axis of the carrier. The support 32 is a composite structure and comprises a standard 33, slidable for adjustment in the support, the standard having a rack 34 engaged by a pinion 35 on the inner end of the shaft 18. A head 36 is secured to the lower end of the standard 32 and constitutes part of a tubular casing 37. An arm 38 is secured to the upper end of the standard 33 and carries a wear plate 39. A boring shaft 40 is journaled in the arm 38 of the support 32. A beveled pinion 41 is located in the opening 26 of the carrier 25 and is splined as indicated at 42 to the boring shaft 40. A beveled pinion 43 is mounted on the inner end of the shaft 22 and meshes into the beveled pinion 41. The upper end of the boring shaft 42 is slotted to receive a prop 44, the upper end of the prop being pivoted at 45 to the boring shaft, the lower end of the prop being in engagement with the wear plate 39, to prevent the boring shaft from moving downwardly, independently of the support 32. An auger 46 of any desired construction is carried by the lower end of the boring shaft 40 and is located at the lower end of the tubular casing 37.

Let it be supposed that the transmission mechanism 16 has been so manipulated that the shaft 18 is not connected with the shaft 11 by way of the shaft 15. Then the operation of the device is as follows: The engine 12, by means of the belt 14 or its equivalent, rotates the shaft 11, motion being transmitted to the shaft 21 by the beveled pinions 23. The beveled pinions 24 transmit motion from the shaft 21 to the shaft 22, the beveled pinions 43 and 41 causing the shaft 22 to rotate the boring shaft 40. The auger 46 loosens the earth and forces the earth upwardly into the tubular casing 37. At any time, the transmission mechanism 16 may be so manipulated as to couple up the shaft 11 with the shaft 18, by way of the shaft 15. Then, the beveled pinions 17, the shaft 15 and the beveled pinions 19 drive the shaft 18, the pinion 35 on the shaft 18 coöperating with the rack 34 to carry the standard 33 downwardly and to permit the shaft 40 to move downwardly, the thrust of the auger 46 against the dirt in the casing 37 serving to carry the shaft 40 downwardly along with the standard 33 when the latter is moved downwardly as above described. A proper manipulation of the transmission 16 will effect a reverse rotation of the shaft 18 and a lifting of the standard 33 and attendant parts. When the standard 33 is lifted as aforesaid, the boring shaft 40 will be lifted also because the prop 44 coöperates with the wear plate 39 on the arm 32. The carrier 25 may be rocked on the shafts 18 and 22, so as to dispose the boring shaft 40 at any desired angle with respect to the vertical. Thus, after the casing 37 has been crowded full of dirt, the casing loaded with dirt, may be swung out of alinement with the hole which has been bored. Then, the prop 44 may be swung on its pivotal mounting 45, so that the prop no longer bears on the wear plate 39. Then endwise movement may be imparted to the boring shaft 40, thus spacing the auger 46 from the mouth of the casing 37, the dirt being discharged readily from the casing when it is held therein no longer by the auger 46.

Having thus described the invention, what is claimed is:—

1. In a device of the class described, a frame; a boring shaft; means for mounting the boring shaft on the frame for rotation and for raising and lowering; means for rotating the shaft; a support mounted to slide in the first specified means; means for operating the support; interengaging elements on the shaft and the support whereby the shaft will be raised when the support is operated; an auger on the shaft; and a casing on the support and coöperating with the auger.

2. A device of the class described, constructed as set forth in claim 2 and further characterized by the fact that said interengaging elements are relatively releasable to permit the shaft to move endwise with respect to the support, thereby to space the auger and the casing.

3. In a device of the class described, a frame; a pair of shafts journaled in the frame; a motor on the frame; means for connecting the motor operatively with one shaft; means for connecting the motor operatively but releasably with the other shaft; a carrier mounted to rock for adjustment on the shafts; a boring shaft mounted to rotate in the carrier and slidable longitudinally therein; mechanism for connecting said one shaft to the boring shaft to secure a rotation of the boring shaft; and mechanism for connecting said other shaft to the boring shaft to secure a longitudinal movement of the boring shaft.

In testimony that I claim the foregoing as my own, I have hereto affixed my signature in the presence of two witnesses.

AMOS A. AMSTUTZ.

Witnesses:
PHILIP H. GABLE,
JACOB D. NUSSBAUM.